United States Patent
Inuzuka et al.

(10) Patent No.: US 11,512,494 B2
(45) Date of Patent: Nov. 29, 2022

(54) CASE AND METHOD OF MANUFACTURING THE SAME

(71) Applicant: AISIN CORPORATION, Kariya (JP)

(72) Inventors: Kazuya Inuzuka, Kariya (JP); Takeshi Maeda, Kariya (JP); Yasuo Kidena, Kariya (JP)

(73) Assignee: AISIN CORPORATION, Aichi (JP)

( * ) Notice: Subject to any disclaimer, the term of this patent is extended or adjusted under 35 U.S.C. 154(b) by 219 days.

(21) Appl. No.: 16/782,304

(22) Filed: Feb. 5, 2020

(65) Prior Publication Data
US 2020/0256088 A1    Aug. 13, 2020

(30) Foreign Application Priority Data

Feb. 8, 2019  (JP) .............................. JP2019-021466

(51) Int. Cl.
| | | |
|---|---|---|
| *B29C 65/16* | (2006.01) | |
| *B23K 26/00* | (2014.01) | |
| *E05B 17/00* | (2006.01) | |
| *B23K 26/34* | (2014.01) | |
| *B23K 26/21* | (2014.01) | |

(52) U.S. Cl.
CPC .......... *E05B 17/0004* (2013.01); *B23K 26/21* (2015.10); *B23K 26/34* (2013.01)

(58) Field of Classification Search
CPC ......... E05B 81/06; E05B 85/02; B23K 26/24; B29C 65/169
See application file for complete search history.

(56) References Cited

U.S. PATENT DOCUMENTS

| | | | | |
|---|---|---|---|---|
| 9,030,835 | B2* | 5/2015 | Frenzel | .............. B29C 65/7829 |
| | | | | 361/752 |
| 10,569,596 | B2* | 2/2020 | Ikai | ......................... B43K 7/06 |
| 11,180,935 | B2* | 11/2021 | Takagi | .................... E05B 15/16 |
| 2002/0179233 | A1* | 12/2002 | Ruotsalainen | .......... B29C 66/65 |
| | | | | 156/274.6 |

(Continued)

FOREIGN PATENT DOCUMENTS

| | | |
|---|---|---|
| CN | 107620529 A | 1/2018 |
| JP | 2005-254481 A | 9/2005 |

(Continued)

OTHER PUBLICATIONS

Office Action dated Mar. 1, 2022, by the State Intellectual Property Office of People's Republic of China in corresponding Chinese Patent Application No. 202010081461.1 . (8 pages).

*Primary Examiner* — Helena Kosanovic
*Assistant Examiner* — Lawrence H Samuels
(74) *Attorney, Agent, or Firm* — Buchanan Ingersoll & Rooney PC (57) ABSTRACT

A case includes a first member and a second member configured in such a way that a closed space is formed between the first and second members in a state where the first and second members abut against each other. The first member includes a shaft portion extending toward the second member. The second member includes a shaft support portion including a circumferential wall portion that surrounds one end portion of the shaft portion. The shaft portion includes an enlarged-diameter portion that is the one end portion melted in such a way as to be enlarged in diameter.

3 Claims, 6 Drawing Sheets

(56) References Cited

U.S. PATENT DOCUMENTS

| | | | | |
|---|---|---|---|---|
| 2004/0082145 A1* | 4/2004 | Reichenbach | ......... | B29C 66/71 |
| | | | | 438/455 |
| 2004/0239007 A1* | 12/2004 | Arai | .................. | B29C 66/1312 |
| | | | | 264/248 |
| 2007/0204954 A1* | 9/2007 | Brunnecker | ........ | B29C 65/7841 |
| | | | | 156/275.7 |
| 2011/0225770 A1* | 9/2011 | Alber | ...................... | E05B 15/02 |
| | | | | 16/402 |
| 2012/0295125 A1* | 11/2012 | Uchida | .................... | B32B 3/06 |
| | | | | 428/594 |
| 2013/0050966 A1* | 2/2013 | Frenzel | .............. | B29C 65/1635 |
| | | | | 361/759 |
| 2013/0299469 A1* | 11/2013 | Uchida | ................ | B23K 33/006 |
| | | | | 219/121.64 |
| 2016/0376813 A1* | 12/2016 | Haake | .................... | E05B 19/00 |
| | | | | 29/428 |
| 2018/0016820 A1* | 1/2018 | Takagi | .................... | E05B 85/02 |
| 2018/0073282 A1 | 3/2018 | Takagi et al. | | |
| 2018/0236807 A1* | 8/2018 | Ikai | ........................ | B43K 15/02 |

FOREIGN PATENT DOCUMENTS

| | | | | | |
|---|---|---|---|---|---|
| JP | | 2005238462 A | * | 9/2005 | ............. B29C 65/00 |
| JP | | 2005254481 A | * | 9/2005 | ........... B29C 65/169 |
| JP | | 2018009422 A | | 1/2018 | |

* cited by examiner

CASE AND METHOD OF MANUFACTURING THE SAME

CROSS REFERENCE TO RELATED APPLICATIONS

This application is based on and claims priority under 35 U.S.C. § 119 to Japanese Patent Application No. 2019-021466, filed on Feb. 8, 2019, the entire content of which is incorporated herein by reference.

TECHNICAL FIELD

This disclosure generally relates to a case and a method of manufacturing the case. Particularly, this disclosure relates to a sealed case including a shaft portion inside and a method of manufacturing the case.

BACKGROUND DISCUSSION

For example, JP2018-9422A (Reference 1) describes a vehicle door lock device. The vehicle door lock device includes various levers such as a latch and a pawl. These levers are housed in a case.

The case includes a first member and a second member. The first member is made of a material that absorbs energy of laser light and is thereby melted, and the second member is made of a material that transmits laser light. The first member and the second member are configured in such a way as to form a space inside in a state where the first member and the second member abut against each other. The first member includes a shaft portion extending toward the second member. The second member includes a housing portion in which a distal end portion of the shaft portion of the first member is housed (refer to FIG. 19 of Reference 1). The housing portion includes a bottom portion (upper bottom portion) and a circumferential wall portion surrounding the shaft portion. The distal end portion of the shaft portion of the first member is inserted into the housing portion of the second member, and a top surface of the shaft portion contacts against a bottom surface of the housing portion of the second member. Laser light is radiated from a side of the second member toward the top surface of the shaft portion. The laser light passes through the second member and reaches the top surface of the shaft portion of the first member. Thereby, a temperature of the top surface of the shaft portion rises, and then the top surface is melted. The heat is transmitted to the bottom surface of the housing portion of the second member, and the bottom surface of the housing portion is also thereby melted. Then, the radiation of the laser light is stopped, and the top surface of the shaft portion and the bottom surface of the housing portion are cooled and solidified. Thus, the top surface of the shaft portion and the bottom surface of the housing portion are welded to each other.

The shaft portion of the case in Reference 1 can be used as a rotational shaft of a lever (or a gear). In this case, when the lever engages with another lever and rotates, a load (radial load) in a direction (radial direction) perpendicular to an extending direction of the shaft portion is applied to the shaft portion. Herein, for example, when an outer diameter of the shaft portion is larger than an inner diameter of the housing portion, or when positions of the shaft portion and the housing portion are slightly deviated from each other, at the time of inserting the distal end portion of the shaft portion into the housing portion, there is a possibility that a relatively large load acts on the shaft portion, and the shaft portion is deformed. For example, there is a possibility that the shaft portion is bent. In this case, operation of the vehicle door lock device may be hindered. For example, it may be difficult for the lever to rotate. Further, an engagement position between the levers may be deviated from a normal position, and vibration or abnormal noise may be generated when the lever rotates.

Meanwhile, for example, when an outer diameter of the shaft portion is smaller than an inner diameter of the shaft support portion, an outer circumferential surface of the distal end portion of the shaft portion is not supported by a circumferential wall portion of the shaft support portion, and only the top surface is supported by the bottom portion of the shaft support portion. Accordingly, when a load as described above is applied to the shaft portion, there is a possibility that the load concentrates on a welded portion between the top surface of the shaft portion and the bottom portion of the housing portion, and a shear fracture occurs in the welded portion. Then, the shaft portion may be greatly deformed until the outer circumferential surface of the distal end portion of the shaft portion contacts against the inner circumferential surface of the shaft support portion and is supported by the inner circumferential surface, thereby hindering operation of the vehicle door lock device.

For this reason, in the case in Reference 1, positional precision and outer-diameter dimensional precision of the shaft portion of the first member, and positional precision and inner-diameter dimensional precision of the shaft support portion of the second member need to be kept high, and manufacturing cost of the case is high.

A need thus exists for a case which is not susceptible to the drawback mentioned above.

SUMMARY

A case according to this disclosure includes a first member and a second member being configured in such a way that a closed space is formed between the first and second members in a state where the first and second members abut against each other. The first member includes a shaft portion extending toward the second member. The second member includes a shaft support portion including a circumferential wall portion that surrounds one end portion of the shaft portion. The shaft portion includes an enlarged-diameter portion that is the one end portion melted in such a way as to be enlarged in diameter.

A method according to this disclosure is a method of manufacturing a case. The case includes a first member made of a material that absorbs energy of laser light and is thereby melted, and a second member made of a material that transmits laser light. The first and second members are configured in such a way as to form a closed space between the first and second members in a state of abutting against each other. The first member includes a shaft portion extending toward the second member, and the second member includes a housing portion in which one end portion of the shaft portion is housed. The method includes a step of, in a state where the one end portion of the shaft portion is housed in the housing portion of the second member, radiating laser light from a side of the second member toward a top surface of the one end portion of the shaft portion, and thereby melting the one end portion of the shaft portion and enlarging the one end portion in diameter.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
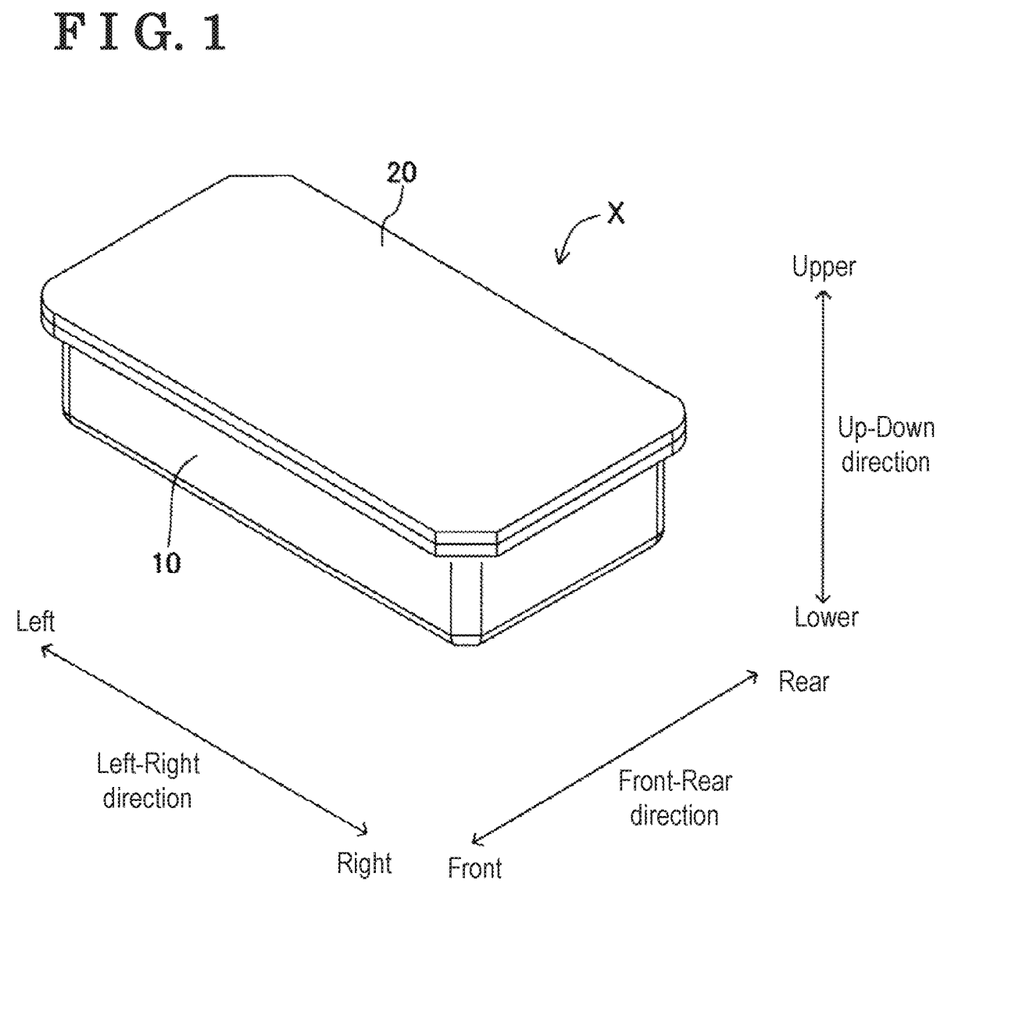
FIG. 1 is a perspective view of a driving device including a case according to one embodiment of this disclosure.

The following describes a driving device X that includes a case 1 (refer to FIG. 1) according to one embodiment of this disclosure. First, an outline of the driving device X is described. The driving device X drives a device Y (refer to FIG. 2 and FIG. 3). The driving device X includes gears G1 and G2, an electric motor M, and a control device C, and these components are housed in the case 1. In the present embodiment, it is assumed that the device Y is also housed in the case 1. Rotational driving force of the electric motor M is transmitted to the device Y via the gears G1 and G2. In other words, the device Y includes an un-illustrated tooth portion that meshes with the gear G2. The device Y is housed inside the case 1 in the present embodiment, but may be arranged outside the case 1.

Figure 2:
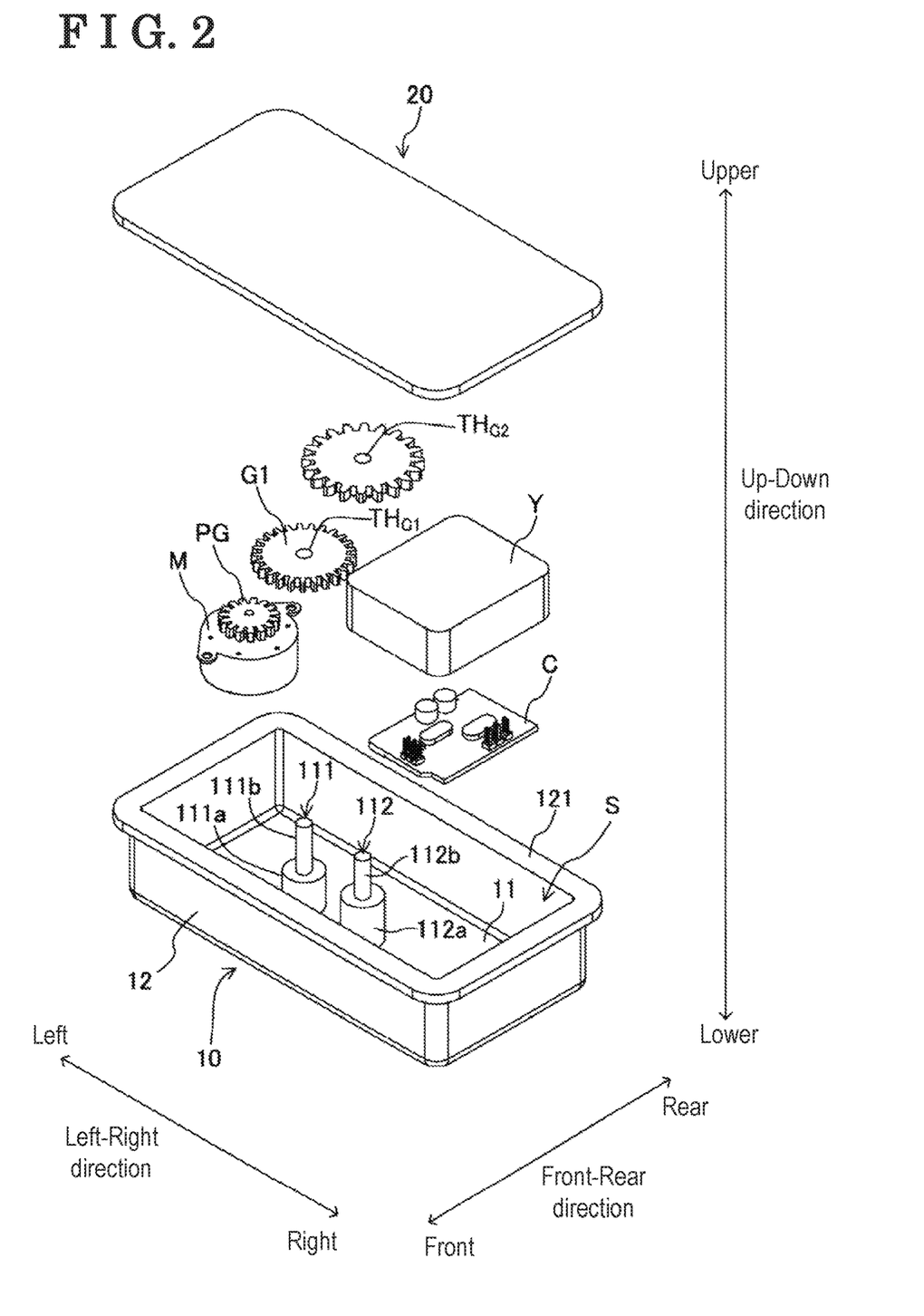
FIG. 2 is an exploded perspective view in which the driving device illustrated in FIG. 1 is disassembled, and constituent components thereof are viewed from an obliquely upper right side.
Figure 3:
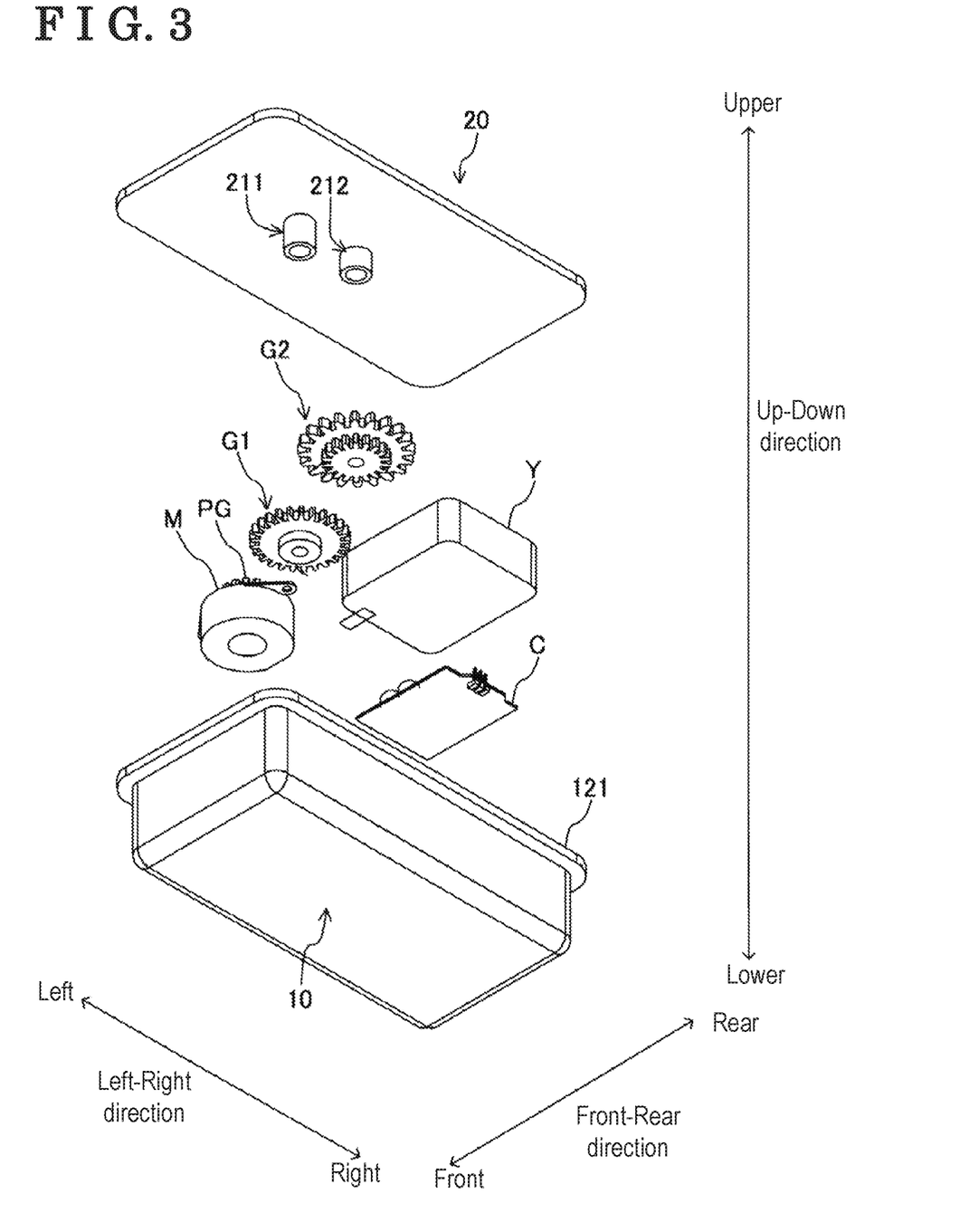
FIG. 3 is an exploded perspective view in which the driving device illustrated in FIG. 1 is disassembled, and constituent components thereof are viewed from an obliquely lower left side.

Next, a configuration of the driving device X is described. As illustrated in FIG. 2 and FIG. 3, the case 1 includes a container 10 (first member) and a cover 20 (second member). The container 10 and the cover 20 are made of synthetic resin. The container 10 is made of a synthetic resin material that absorbs energy of laser light and is thereby melted. The cover 20 is made of a synthetic resin material that transmits laser light.

The container 10 is a box-like member having a shape of a substantially rectangular parallelepiped. In the following description, a depth direction of the container 10 is referred to as an up-down direction. An extending direction of a long side of the container 10 is referred to as a left-right direction, and an extending direction of a short side of the container 10 is referred to as a front-rear direction. The container 10 includes a bottom wall portion 11 and a circumferential wall portion 12. The bottom wall portion 11 is a rectangular plate-like portion extending in the left-right direction. A wall thickness direction of the bottom wall portion 11 corresponds to the up-down direction. The circumferential wall portion 12 is provided along the outer peripheral portion of the bottom wall portion 11, and surrounds a space on an upper side of the bottom wall portion 11. The circumferential wall portion 12 is substantially perpendicular to the bottom wall portion 11.

Figure 4A:
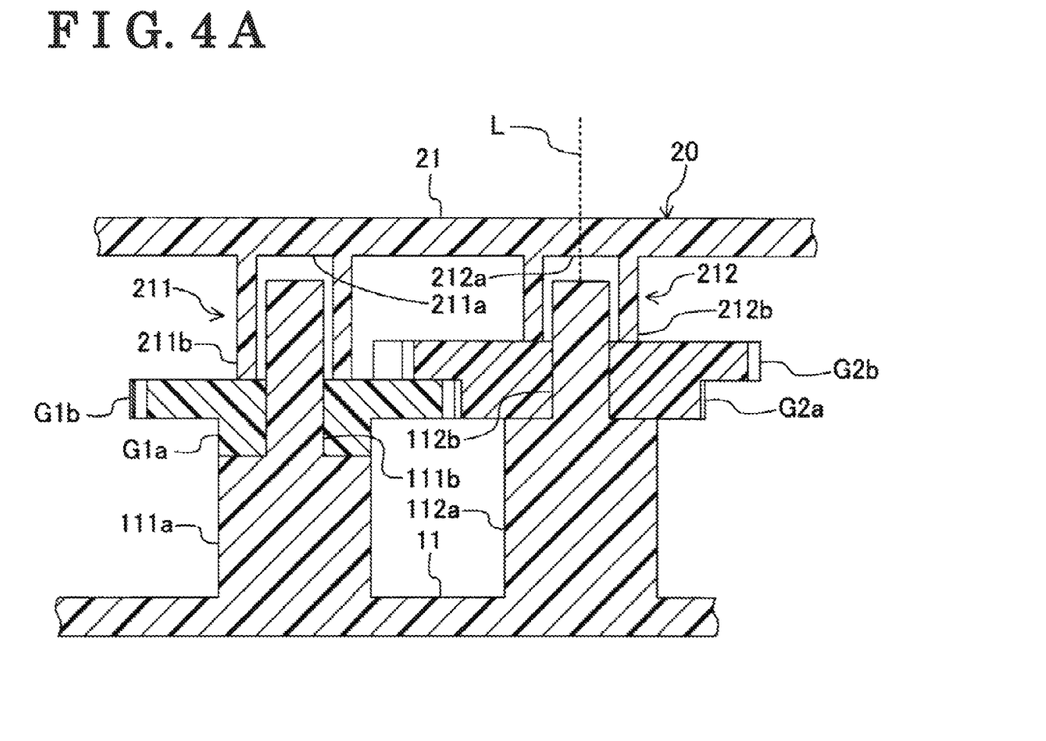
FIG. 4A is a cross-sectional view illustrating a step of welding a shaft portion to a shaft support portion and illustrating a cross section that is perpendicular to a front-rear direction of the driving device and that includes a central axis of the shaft portion.

On an upper surface of the bottom wall portion 11, two shaft portions 111 and 112 are formed. The shaft portions 111 and 112 are column portions extending in the up-down direction. The shaft portions 111 and 112 are positioned at a substantially central portion of the bottom wall portion 11 in the front-rear direction. The shaft portions 111 and 112 are separated from each other in the left-right direction. The shaft portions 111 and 112 include base portions 111a and 112a slightly protruding upward from the upper surface of the bottom wall portion 11, and include body portions 111b and 112b extending upward from central portions of top surfaces of the base portions 111a and 112a (refer to FIG. 4A). Outer diameters of the base portions 111a and 112a are slightly larger than outer diameters of the body portions 111b and 112b. The base portion 112a has a protrusion height slightly larger than a protrusion height of the base portion 111a. Outer diameters of the body portions 111b and 112b are constant in a range from lower ends thereof to upper ends thereof.

An up-down direction position of an upper end of the circumferential wall portion 12 is slightly higher than up-down direction positions of upper ends of the shaft portions 111 and 112. At an outer circumferential surface of the upper end of the circumferential wall portion 12, there is formed a flange portion 121 projecting to an outer side of the container 10.

The cover 20 is a plate-like member that has a substantially rectangular shape and that extends in the left-right direction (refer to FIG. 2 and FIG. 3). As described below in detail, the cover 20 is placed on an upper end surface of the container 10, and the container 10 and the cover 20 are welded to each other. Thereby, a closed space S (sealed space) is formed between the container 10 and the cover 20.

The cover 20 has an external shape substantially the same as an external shape of the container 10 in a plan view. In other words, the cover 20 has an outer circumferential shape substantially the same as an outer circumferential shape of the flange portion 121. In a lower surface of the cover 20, shaft support portions 211 and 212 are formed (refer to FIG. 3 and FIG. 4A). The shaft support portions 211 and 212 are associated with the shaft portions 111 and 112 of the container 10, respectively, and support distal end portions (upper end portions) of the shaft portions 111 and 112. The shaft support portions 211 and 212 are tubular portions that protrudes downward from the lower surface of a cover plate portion 21. The shaft support portions 211 and 212 includes closed upper ends and opened lower ends. In other words, the shaft support portions 211 and 212 include upper bottom portions 211a and 212a and cylindrical circumferential wall portions 211b and 212b. The shaft support portion 211 has a protrusion height slightly larger than a protrusion height of the shaft support portion 212. Positions of the shaft support portions 211 and 212 in the cover plate portion 21 are set in such a way that central axes of the body portions 111*b* and 112*b* are substantially aligned with central axes of the circumferential wall portions 211*b* and 212*b* in a state where the cover 20 is placed on the upper end surface of the container 10. The circumferential wall portions 211*b* and 212*b* have inner diameters slightly larger than outer diameters of the body portions 111*b* and 112*b* of the shaft portions 111 and 112.

The electric motor M is a well-known direct-current motor. The electric motor M is connected to the below-described control device C. The electric motor M is connected to an un-illustrated power supply device, and from the power supply device to the electric motor M, electric power is supplied. The control device C controls rotational speed and rotational direction of the electric motor M. The electric motor M includes a driving shaft to which a pinion gear PG is attached. The electric motor M is fixed to an un-illustrated support portion provided at a left end portion of the container 10.

The gear G1 is a spur gear (refer to FIG. 2 and FIG. 3). The gear G1 includes a base portion G1*a* and a tooth portion G1*b*. The base portion G1*a* is a disk-like part perpendicular to the up-down direction. The base portion G1*a* has an outer diameter that is substantially the same as an outer diameter of the base portion 111*a* of the shaft portion 111. The tooth portion G1*b* is arranged on an upper side of the base portion G1*a*. The tooth part G1*b* is a disk-like part perpendicular to the up-down direction. The tooth portion G1*b* includes an outer circumferential surface on which a plurality of teeth are provided. The tooth portion G1*b* has an outer diameter (a diameter of a pitch circle) that is larger than the outer diameter of the base portion G1*a*. At a central portion of the gear G1, there is formed a through hole $TH_{G1}$ that penetrates therethrough in the up-down direction. Into the through hole $TH_{G1}$, the body portion 111*b* of the shaft 111 is inserted, and the gear G1 is rotatably supported around the body portion 111*b*. The tooth portion G1*b* of the gear G1 meshes with the pinion gear PG.

The gear G2 is a stepped gear. The gear G2 includes a first tooth portion G2*a* and a second tooth portion G2*b*. The first tooth portion G2*a* and the second tooth portion G2*b* are disk-like portions. The first tooth portion G2*a* and the second tooth portion G2*b* each include an outer circumferential surface on which a plurality of teeth are provided. The first tooth portion G2*a* has an outer diameter larger than an outer diameter of the base portion 112*a*. The second tooth portion G2*b* is arranged on an upper side of the first tooth portion G2*a*. The second tooth portion G2*b* has an outer diameter (a diameter of a pitch circle) that is larger than the outer diameter of the first tooth portion G2*a*. At a central portion of the gear G2, there is formed a through hole $TH_{G2}$ that penetrates therethrough in the up-down direction. Into the through hole $TH_{G2}$, the body portion 112*b* of the shaft portion 112 is inserted, and the gear G2 is rotatably supported around the body portion 112*b*. The first tooth portion G2*a* of the gear G2 meshes with the tooth portion G1*b* of the gear G1. The device Y is fixed to an un-illustrated support portion provided at a right end portion of the container 10. The second tooth portion G2*b* of the gear G2 meshes with an un-illustrated tooth portion of the device Y.

The control device C is fixed to an un-illustrated support portion provided at the right end portion (on a lower side of the device Y) of the container 10. The control device C is a computer device that includes an operation device, a storage device (memory), a communication device, and the like. The control device C controls a rotational speed and a rotational direction of the electric motor M in accordance with a predetermined program or a command supplied via the communication device from an external device (host computer).

The cover 20 is welded to the container 10 as follows. First, the cover 20 is placed on the upper end surface (the upper surface of the flange portion 121) of the container 10 that has housed the electric motor M, the gears G1 and G2, the control device C, and the device Y. In a state where an outer periphery of the cover 20 arranged along an outer periphery of the flange portion 121, the upper end portion of the body portion 111*b* of the shaft portion 111 and the upper end portion of the body portion 112*b* of the shaft portion 112 are housed in the shaft support portion 211 and the shaft support portion 212, respectively (refer to FIG. 4A). The gear G1 is sandwiched between the base portion 111*a* and the circumferential wall portion 211*b*, and movement of the gear G1 in the up-down direction is restricted. The gear G2 is sandwiched between the base portion 112*a* and the circumferential wall portion 212*b*, and movement of the gear G2 in the up-down direction is restricted. A top surface of the body portion 111*b* and a top surface of the body portion 112*b* are separated from the upper bottom portion 211*a* and the upper bottom portion 212*a* in the up-down direction.

Figure 4B:
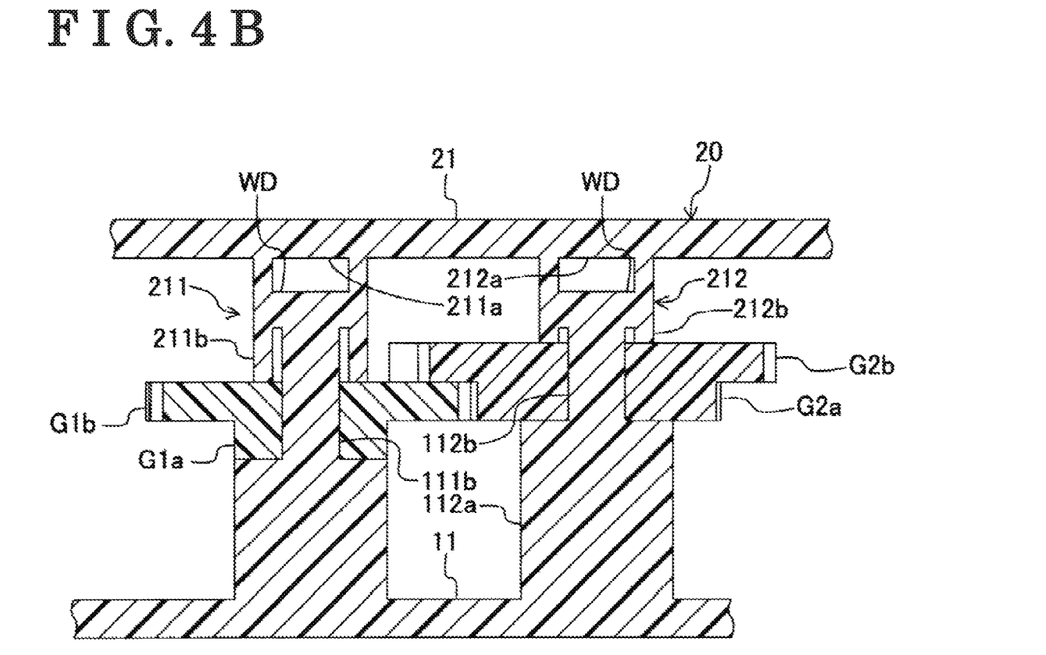
FIG. 4B is a cross-sectional view illustrating a state where the shaft portion is welded to the shaft support portion via the step illustrated in FIG. 4A and illustrating the cross section that is perpendicular to the front-rear direction of the driving device and that includes the central axis of the shaft portion.

Next, from an upper side of the cover 20, laser light L is radiated to the top surfaces of the body portion 111*b* and the body portion 112*b* through the upper bottom portion 211*a* and the upper bottom portion 212*a*. The top surfaces of the body portion 111*b* and the body portion 112*b* absorb energy of the laser light L and generate heat, and these parts are thereby melted. These melted portions flow to sides of the outer circumferences of the body portion 111*b* and the body portion 112*b*, enter a gap between the body portion 111*b* and the circumferential wall portion 211*b* and a gap between the body portion 112*b* and the circumferential wall portion 212*b*, flow slightly downward, and are cooled and solidified (refer to FIG. 4B). Thus, the distal end portions of the body portion 111*b* and the body portion 112*b* are enlarged in diameter. At this time, the heat of the melted portions is transmitted to the outer circumferential surfaces of the body portion 111*b* and the body portion 112*b* and the inner circumferential surfaces of the circumferential wall portion 211*b* and the circumferential wall portion 212*b*, and these parts are thereby slightly melted. The outer circumferential surfaces of the body portion 111*b* and the body portion 112*b* and the inner circumferential surfaces of the circumferential wall portion 211*b* and the circumferential wall portion 212*b* that have been melted are solidified, and thereby, the upper end portion of the shaft portion 111 and the upper end portion of the shaft portion 112 are welded to the shaft support portion 211 and the shaft support portion 212, respectively.

Next, from an upper side of the cover 20, laser light L is scanned along the flange portion 121 while being radiated to the top surface of the flange portion 121 through the outer peripheral portion of the cover 20. A part that is in the upper surface of the flange portion 121 and that is irradiated with the light L absorbs energy of the laser light L and generates heat, and this part is thereby melted. The heat of this melted portion is transmitted to a lower surface of the outer peripheral portion of the cover 20, and this part is thereby slightly melted. When the laser light passes, the melted part is cooled and solidified. Thus, the flange portion 121 and the outer peripheral portion of the cover 20 are welded to each other. In other words, the sealed case 1 is formed.

When the device Y is arranged outside the case 1, a rotational shaft of the gear G2 is made to extend to an outside of the case 1 via an un-illustrated mechanical seal (a contact type sealing device for a rotating shaft), and this part is connected to the device Y. Alternatively, a non-contact type joint (a joint that transmits driving force by using magnetic force) may be used.

Figure 5A:
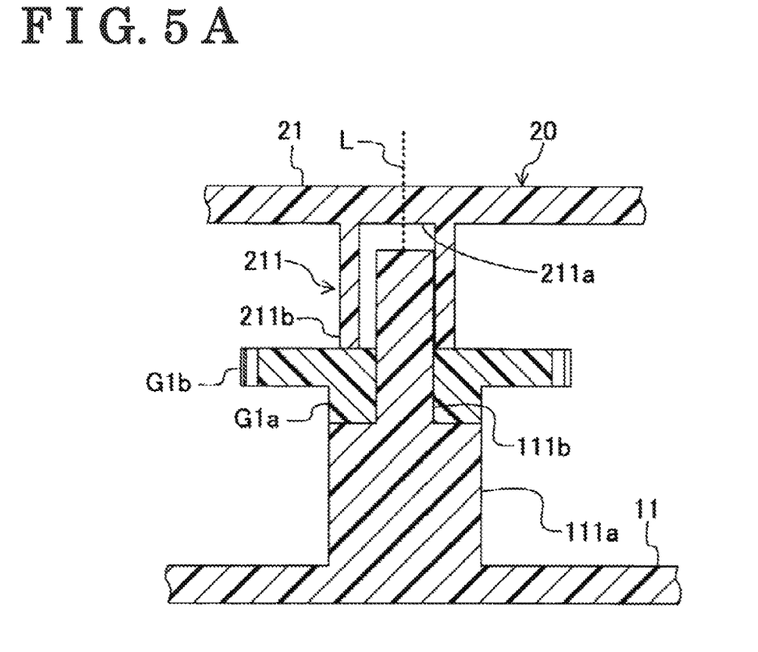
FIG. 5A is a cross-sectional view illustrating a step of welding the shaft portion to the shaft support portion in a state where the central axis of the shaft portion is deviated from a central axis of the shaft support portion and illustrating a cross section that is perpendicular to the front-rear direction of the driving device and that includes the central axis of the shaft portion.
Figure 5B:
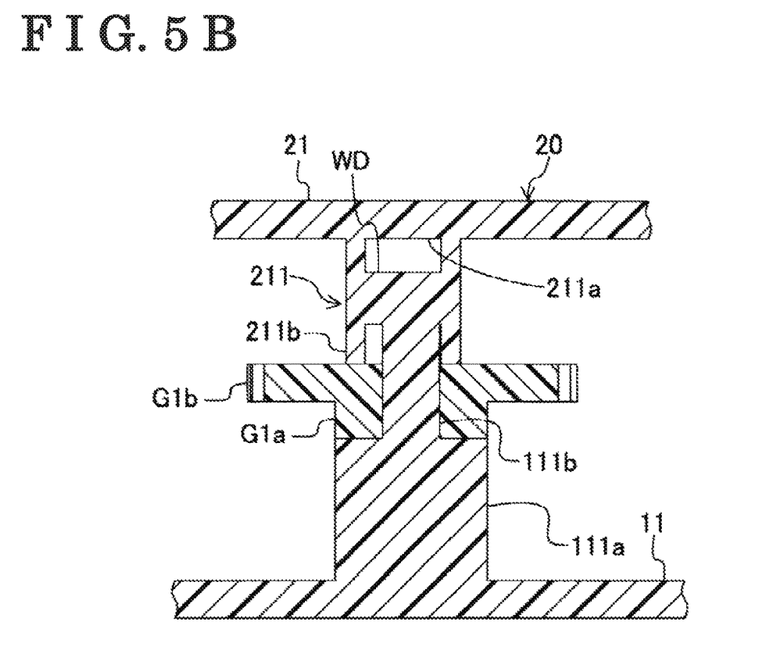
FIG. 5B is a cross-sectional view illustrating a state where the shaft portion is welded to the shaft support portion via the step illustrated in FIG. 5A and illustrating the cross section that is perpendicular to the front-rear direction of the driving device and that includes the central axis of the shaft portion.

As described above, the inner diameters of the shaft support portion 211 and the shaft support portion 212 are slightly larger than the outer diameters of the body portions 111*b* and the body portions 112*b*. For this reason, even when processed precision (positional precision and radial-direction dimensional precision) of one or more of the shaft portion 111, the shaft portion 112, the shaft support portion 211, and the shaft support portion 212 is somewhat low, the body portion 111*b* and the body portion 112*b* do not interfere with the shaft support portion 211 and the shaft support portion 212, respectively (refer to FIG. 5A and FIG. 5B). In other words, the body portion 111*b* and the body portion 112*b* are housed in the shaft support portion 211 and the shaft support portion 212, respectively, without application of loads of deforming the body portion 111*b* and the body portion 112*b*. In other words, a state where the body portion 111*b* and the body portion 112*b* extend straight is maintained. Accordingly, friction of the gear G1 and the gear G2 with the body portion 111*b* and the body portion 112*b* is small, and the gear G1 and the gear G2 rotate smoothly. Further, the gear G1 and the gear G2 mesh with each other at a normal position. For this reason, generation of vibration, abnormal noise, and the like of the driving device X can be prevented.

Supposing that the outer circumferential surface of the body portion 111*b* is not supported by the circumferential wall portion 211*b* of the shaft support portion 211, and only the top surface of the body portion 111*b* and the upper bottom 211*a* are welded to each other, there is a possibility that a shear fracture occurs in this welded portion as described above. In this case, there is a possibility that the gear G1 and the gear G2 do not mesh with each other, and driving force is not transmitted.

In contrast to this, in the present embodiment, the outer circumferential surface of the upper end portion of the body portion 111*b* is welded to the inner circumferential surface of the circumferential wall portion 211*b*. Accordingly, when a radial load acts on the body portion 111*b* at the time of operation of the driving device X, a compressive load acts on a part of the welded portion. According to this configuration, the welded portion is less likely to be broken at the time of operation of the driving device X than in a configuration in which only the top surface of the body portion 111*b* and the upper bottom portion 211*a* are welded to each other. For this reason, even when a radial load acts on the body portion 111*b*, the body portion 111*b* is hardly deformed. Therefore, there is not a possibility that operation of the driving device X is hindered.

As described above, according to the present embodiment, even when processed precision (positional precision and radial-direction dimensional precision) of one or more of the shaft portion 111, the shaft portion 112, the shaft support portion 211, and the shaft support portion 212 is somewhat low, there is not a possibility that operation of the driving device X is hindered. For this reason, manufacturing cost of the case 1 can be reduced.

Further, in the case 1, the outer peripheral portions of the container 10 and the cover 20 are welded to each other over an entire circumference. The substantially central portion of such a sealed case 1 is supported by the shaft portion 111 and the shaft portion 112. Accordingly, rigidity of the entire case 1 is relatively high.

Implementation of this disclosure is not limited to the above-described embodiment, and various modifications can be made without departing from the object of this disclosure.

Figure 6:
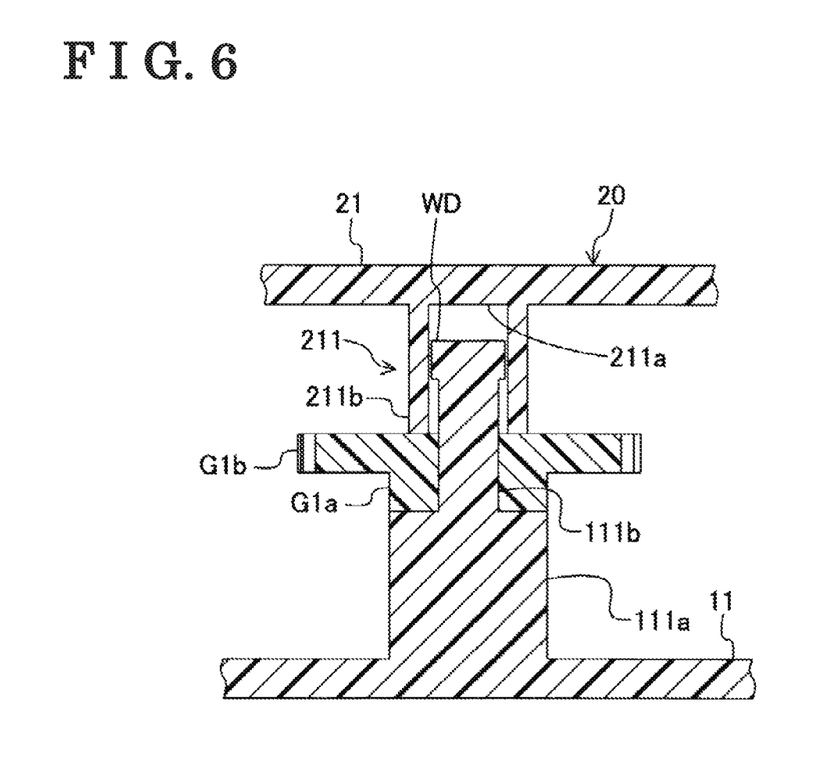
FIG. 6 is a cross-sectional view illustrating a state where a distal end portion of the shaft portion is enlarged in diameter via the step illustrated in FIG. 4A and illustrating the cross section that is perpendicular to the front-rear direction of the driving device and that includes the central axis of the shaft portion.

In the above-described embodiment, the upper end portions of the body portion 111*b* and the body portion 112*b* are melted and enlarged in diameter, and the outer circumferential surfaces of the enlarged-diameter portions WD are welded to the inner circumferential surfaces of the circumferential wall portion 211*b* and the circumferential wall portion 212*b*. However, the outer circumferential surfaces of the enlarged-diameter portions WD do not need to be welded to the inner circumferential surfaces of the circumferential wall portion 211*b* and the circumferential wall portion 212*b*. In other words, the upper end portions of the body portion 111*b* and the body portion 112*b* may be melted and enlarged in diameter, and gaps between the body portion 111*b* and the circumferential wall portion 211*b* and between the body portion 112*b* and the circumferential wall portion 212*b* may be merely reduced (refer to FIG. 6). According to this, when radial loads act on the body portion 111*b* and the body portion 112*b*, the outer circumferential surfaces of the enlarged-diameter portions contact against and are supported by the inner circumferential surfaces of the circumferential wall portion 211*b* and the circumferential wall portion 212*b* in a state where the body portion 111*b* and the body portion 112*b* are slightly deformed. Further deformation of the body portion 111*b* and the body portion 112*b* is prevented. For this reason, operation of the driving device X is hardly hindered.

A case according to this disclosure includes a first member and a second member being configured in such a way that a closed space is formed between the first and second members in a state where the first and second members abut against each other. The first member includes a shaft portion extending toward the second member. The second member includes a shaft support portion including a circumferential wall portion that surrounds one end portion of the shaft portion. The shaft portion includes an enlarged-diameter portion that is the one end portion melted in such a way as to be enlarged in diameter.

A method according to this disclosure is a method of manufacturing a case. The case includes a first member made of a material that absorbs energy of laser light and is thereby melted, and a second member made of a material that transmits laser light. The first and second members are configured in such a way as to form a closed space between the first and second members in a state of abutting against each other. The first member includes a shaft portion extending toward the second member, and the second member includes a housing portion in which one end portion of the shaft portion is housed. The method includes a step of, in a state where the one end portion of the shaft portion is housed in the housing portion of the second member, radiating laser light from a side of the second member toward a top surface of the one end portion of the shaft portion, and thereby melting the one end portion of the shaft portion and enlarging the one end portion in diameter.

In the case according to this disclosure, the shaft portion includes an enlarged-diameter portion as the one end portion that is melted in such a way as to be enlarged in diameter. In other words, an inner diameter of the shaft support portion is set to be slightly larger than an outer diameter of the shaft portion, and into the inner circumferential portion thereof, the one end portion of the shaft portion is inserted, and then, the one end portion of the shaft portion is melted and enlarged in diameter, whereby a gap between an outer circumferential surface of the shaft portion and an inner circumferential surface of the shaft support portion is reduced. For this reason, even when processed precision (positional precision and radial-direction dimensional precision) of one or both of the shaft portion and the shaft support portion is somewhat low, the shaft portion and the shaft support portion do not interfere with each other when the first member and the second member are made to abut against each other. In other words, the one end portion of the shaft portion is housed in the shaft support portion without application of a load of deforming the shaft portion. In other words, a state where the shaft portion extends straight is maintained. Accordingly, a lever, a gear, or the like fitted into the shaft portion smoothly rotates around the shaft portion. Further, engagement between this member and another member is unlikely to be hindered.

Furthermore, when a radial load acts on the shaft portion, the outer circumferential surface of the enlarged-diameter portion contacts against and is supported by the inner circumferential surface of the circumferential wall portion in a state where the shaft portion is slightly deformed. Thereby, further deformation of the shaft portion is prevented. Accordingly, there is almost no possibility that operation of a device using the case according to this disclosure is hindered.

Even when processed precision (positional precision and radial-direction dimensional precision) of one or both of the shaft portion and the shaft support portion is somewhat low, operation of a device using the case is unlikely to be hindered. For this reason, manufacturing cost of the case can be reduced.

In the case according to one aspect of this disclosure, the enlarged-diameter portion may include an outer circumferential surface welded to an inner circumferential surface of the circumferential wall portion.

Herein, as described above, when the outer circumferential surface of the shaft portion is not supported by the circumferential wall portion of the shaft support portion, and only a top surface of the shaft portion and one side surface of the second member are welded to each other, there is a possibility that a shear fracture occurs in the welded portion. In this case, there is a possibility that operation of a device using the case is hindered.

In contrast to this, in the case of this disclosure, the outer circumferential surface of the enlarged-diameter portion is welded to the inner circumferential surface of the shaft support portion. Accordingly, when a radial load acts on the shaft portion at the time of operation of a device using the case according to this disclosure, a compressive load acts on a part of the welded portion. According to this configuration, the welded portion is less likely to be broken than in a configuration in which the top surface of the shaft portion and the one side surface of the second member are welded to each other and the shaft portion is not supported by the circumferential wall portion. For this reason, even when a radial load acts on the shaft portion, the shaft portion is hardly deformed. Therefore, there is not a possibility that operation of a device using the case according to this disclosure is hindered.

In the case according to another aspect of this disclosure, outer peripheral portions of the first member and the second member may be welded to each other over an entire circumference.

An intermediate portion of the closed case according to this aspect is supported by the shaft portion. Accordingly, rigidity of the entire case is relatively high.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A case comprising a first member and a second member being configured in such a way that a closed space is formed between the first and second members in a state where the first and second members abut against each other, wherein
   the first member includes a shaft portion extending toward the second member,
   the second member includes a shaft support portion including a circumferential wall portion that surrounds one end portion of the shaft portion,
   the shaft portion includes an enlarged-diameter portion that is the one end portion melted in such a way as to be enlarged in outer diameter,
   the enlarged-diameter portion includes an outer circumferential surface welded to an inner circumferential surface of the circumferential wall portion which surrounds the outer circumferential surface of the enlarged-diameter portion, such that a top surface of the one end portion is separated from an upper bottom portion of the shaft support portion in an up-down direction, and such that directly below a location of the welded circumferential surfaces, there is a location with at least some space between the outer circumferential surface of the shaft portion and the inner circumferential surface of the circumferential wall portion, and
   prior to the one end portion of the shaft portion being melted in such a way as to be enlarged in outer diameter, the inner diameter of the inner circumferential surface of the circumferential wall portion of the shaft support portion Is larger than the outer diameter of the one end portion of the shaft portion in the direction in which the shaft portion extends.

2. The case according to claim 1, wherein outer peripheral portions of the first member and the second member are welded to each other over an entire circumference.

3. A method of manufacturing a case including: a first member made of a material that absorbs energy of laser light and is thereby melted; and a second member made of a material that transmits laser light, wherein the first and second members are configured in such a way as to form a closed space between the first and second members in a state of abutting against each other, the first member includes a shaft portion extending toward the second member, and the second member includes a shaft support portion in which one end portion of the shaft portion is housed,
   the method comprising:
   a step of, in a state where the one end portion of the shaft portion is housed in the shaft support portion of the second member and an inner diameter of an inner circumferential surface of a circumferential wall portion of the shaft support portion is larger than an outer diameter of the one end portion of the shaft portion in the direction in which the shaft portion extends, radiating laser light from a side of the second member toward a top surface of the one end portion of the shaft portion, and thereby melting the one end portion of the shaft portion and enlarging the one end portion of the shaft portion in outer diameter so that an outer circumferential surface of the enlarged-diameter portion is welded to the inner circumferential surface of the circumferential wall portion of the shaft support portion which surrounds the outer circumferential surface of the enlarged-diameter portion, and such that the top surface of the one end portion is separated from the shaft support portion in an up-down direction, and such that directly below the location of the welded circumferential surfaces, there is a location with at least some space between the outer circumferential surface of the shaft and the inner circumferential surface of the circumferential wall portion.

* * * * *